US012706090B2

(12) United States Patent
Kim et al.

(10) Patent No.: US 12,706,090 B2
(45) **Date of Patent: *Aug. 11, 2026**

(54) METHOD AND APPARATUS WITH REAL-TIME TRANSLATION

(71) Applicant: Samsung Electronics Co., Ltd., Suwon-si (KR)

(72) Inventors: Youngmin Kim, Hwaseong-si (KR); Hwidong Na, Seongnam-si (KR); Min-Joong Lee, Suwon-si (KR); Hodong Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 137 days.

This patent is subject to a terminal disclaimer.

(21) Appl. No.: 18/599,553

(22) Filed: Mar. 8, 2024

(65) Prior Publication Data

US 2024/0212675 A1 Jun. 27, 2024

Related U.S. Application Data

(63) Continuation of application No. 16/851,211, filed on Apr. 17, 2020, now Pat. No. 11,955,118.

(30) Foreign Application Priority Data

Sep. 17, 2019 (KR) ........................ 10-2019-0114280

(51) Int. Cl.
*G10L 15/183* (2013.01)
*G10L 15/00* (2013.01)

(52) U.S. Cl.
CPC .......... *G10L 15/183* (2013.01); *G10L 15/005* (2013.01)

(58) Field of Classification Search
CPC ....... G10L 15/183; G10L 13/00; G10L 25/48; G10L 15/22; G10L 15/005; G10L 15/26; G06F 40/40; G06F 40/58
See application file for complete search history.

(56) References Cited

U.S. PATENT DOCUMENTS 5,157,606 A * 10/1992 Nagashima ............. G06F 40/58 715/239
7,539,619 B1 * 5/2009 Seligman ................ G10L 15/30 704/277

(Continued)

FOREIGN PATENT DOCUMENTS

CA 2 799 892 A1 6/2014
CN 106791913 A 5/2017

(Continued)

OTHER PUBLICATIONS

Korean Office Action issued on Feb. 12, 2025, in corresponding Korean Patent Application No. 10-2019-0114280. (3 pages in English, 8 pages in Korean).

*Primary Examiner* — Jakieda R Jackson
(74) *Attorney, Agent, or Firm* — NSIP Law

(57) ABSTRACT

A real-time processor-implemented translation method and apparatus is provided. The real-time translation method includes receiving a content, determining a delay time for real-time translation based on a silence interval of the received content and an utterance interval of the received content, generating a translation result by translating a language used in the received content, and synthesizing the translation result and the received content.

6 Claims, 7 Drawing Sheets

(56) References Cited

U.S. PATENT DOCUMENTS 9,418,063 B2 8/2016 Crosley
9,524,295 B2 12/2016 Waibel
10,599,784 B2 3/2020 Yoo
10,691,898 B2 6/2020 Sun et al.
2004/0122678 A1* 6/2004 Rousseau ................ G10L 17/26 704/277
2005/0192811 A1* 9/2005 Parks ...................... G10L 15/26 704/277
2007/0118363 A1 5/2007 Sasaki et al.
2007/0133938 A1* 6/2007 Park ................... H04N 21/4147 386/E5.042
2008/0046229 A1* 2/2008 Maskey ................ G06F 40/289 704/2
2008/0077390 A1* 3/2008 Nagao ..................... G10L 15/28 704/7
2008/0091407 A1* 4/2008 Furihata .................. G06F 40/45 704/E15.04
2009/0271178 A1* 10/2009 Bodin ..................... G06F 40/58 704/8
2009/0306981 A1* 12/2009 Cromack .............. G06F 16/685 707/E17.103
2010/0208605 A1* 8/2010 Wang ...................... H04L 65/80 370/252
2012/0253784 A1* 10/2012 Maskey .................. G06F 40/58 704/E11.001
2013/0226553 A1* 8/2013 Ji ............................ G06F 40/44 704/2
2014/0249797 A1* 9/2014 Liu ....................... G06F 40/194 704/2
2014/0337989 A1* 11/2014 Orsini ................... H04L 51/212 726/26
2015/0120278 A1* 4/2015 Waibel .................. G06F 40/166 704/2
2015/0134322 A1* 5/2015 Cuthbert ................. G06F 40/58 704/3
2015/0363389 A1 12/2015 Zhang et al.
2015/0378991 A1 12/2015 Crosley
2016/0092438 A1* 3/2016 Sonoo ..................... G06F 40/58 704/2
2016/0314116 A1 10/2016 Kamatani et al.
2017/0072308 A1 3/2017 Perry et al.
2017/0078357 A1 3/2017 McCue et al.
2017/0091177 A1 3/2017 Sonoo et al.
2017/0372693 A1 12/2017 Rangarajan Sridhar et al.
2018/0174612 A1 6/2018 Schulz
2018/0276203 A1* 9/2018 Cuthbert ................. G10L 25/48
2019/0114322 A1 4/2019 Huang
2020/0120396 A1* 4/2020 Jamal ................. H04N 21/4825
2020/0213680 A1 7/2020 Ingel et al.

FOREIGN PATENT DOCUMENTS

CN 107484002 A 12/2017
CN 107436865 B 10/2020
JP 2001-224002 A 8/2001
JP 2016-71761 A 5/2016
KR 10-2014-0146965 A 12/2014
KR 10-2015-0037061 A 4/2015
KR 10-2015-0137383 A 12/2015
KR 10-2018-0066513 A 6/2018
KR 10-2018-0119101 A 11/2018
KR 10-2019-0052365 A 5/2019
WO WO 2020201620 A1 10/2020

* cited by examiner

METHOD AND APPARATUS WITH REAL-TIME TRANSLATION

CROSS-REFERENCE TO RELATED APPLICATIONS

This application is a continuation of application Ser. No. 16/851,211, filed on Apr. 17, 2020, which claims the benefit under 35 USC § 119(a) of Korean Patent Application No. 10-2019-0114280 filed on Sep. 17, 2019, in the Korean Intellectual Property Office, the entire disclosures of which are incorporated herein by reference for all purposes.

BACKGROUND

1. Field

The following description relates to a method and apparatus with real-time translation.

2. Description of Related Art

Artificial neural network-based technology has enabled various technical tasks or goals that may have previously been difficult to perform, to be more easily performed in view of advances in the field of artificial intelligence (AI).

As an example, improvements in performance have been observed in the fields of translation and speech recognition, and artificial intelligence has been applied to various applied technologies associated with automated real-time translation.

As non-limiting examples, automated translation technology based on artificial neural networks may be classified broadly into three parts: speech recognition (speech-to-text), automated translation (text-to-text), and speech synthesis (text-to-speech).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a real-time processor-implemented translation method includes receiving a content, determining a delay time for a real-time translation based on a silence interval of the received content and an utterance interval of the received content, generating a translation result by translating a phrasing used in the received content based on the determined delay time, and synthesizing the generated translation result and the received content.

The method may further include determining a time-shift of the received content based on a determined language used in the received content, and storing an amount of the received content corresponding to the determined time-shift.

The determining of the delay time may include calculating the delay time based on the silence interval; and calculating the delay time based on the utterance interval.

The calculating of the delay time based on the silence interval may include extracting the silence interval from the received content, and calculating the delay time based on a time corresponding to the silence interval.

The calculating of the delay time based on the utterance interval may include extracting the utterance interval from the received content; and calculating the delay time based on a time corresponding to the utterance interval.

The determining of the delay time may further include extracting an audio in the utterance interval from the received content; and filtering an utterance from the extracted audio.

The generating of the translation result may include generating at least one candidate translation result by translating the phrasing used in the received content, comparing an utterance length of the generated candidate translation result to the delay time, and replacing the generated candidate translation result with a second candidate translation result based on a result of the comparing of the utterance length of the generated candidate translation result to the delay time.

The generating of the translation result may include comparing an utterance length of the second candidate translation result to the delay time, and rephrasing the second candidate translation result based on a result of the comparing of the utterance length of the second candidate translation result to the delay time.

The generating of the translation result may include comparing an utterance length of the rephrased second candidate translation result to the delay time; and adjusting an utterance speed of the rephrased second candidate translation result based on a result of the comparing of the utterance length of the rephrased second candidate translation result to the delay time.

The generating of the translation result may include generating the translation result by directly translating a speech included in the received content into speech in a target language; or generating the translation result by translating the speech included in the received content into a text in the target language.

In a general aspect, a real-time translation apparatus includes a receiver configured to receive a content; and a processor configured to determine a delay time for real-time translation based on a silence interval of the received content and an utterance interval of the received content, generate a translation result by translating a phrasing used in the received content based on the determined delay time, and synthesize the generated translation result and the received content.

The processor may be configured to determine a time-shift of the received content based on a determined language used in the received content; and store an amount of the received content corresponding to the determined time-shift.

The processor may be configured to calculate the delay time based on the silence interval, and calculate the delay time based on the utterance interval.

The processor may be configured to extract the silence interval from the content, and calculate the delay time based on a time corresponding to the silence interval.

The processor may be configured to extract the utterance interval from the received content; and calculate the delay time based on a time corresponding to the utterance interval.

The processor may be configured to extract an audio in the utterance interval from the received content; and filter an utterance from the extracted audio.

The processor may be configured to generate at least one candidate translation result by translating the phrasing used in the received content, compare an utterance length of the generated candidate translation result to the delay time; and replace the generated candidate translation result with a second candidate translation result based on a result of the comparing of the utterance length of the generated candidate translation result to the delay time.

The processor may be configured to compare an utterance length of the second candidate translation result to the delay time; and rephrase the second candidate translation result based on a result of the comparing of the utterance length of the second candidate translation result to the delay time.

The processor may be configured to compare an utterance length of the rephrased second candidate translation result to the delay time; and adjust an utterance speed of the rephrased second candidate translation result based on a result of the comparing of the utterance length of the rephrased second candidate translation result to the delay time.

The processor may be configured to generate the translation result by directly translating a speech included in the received content into a speech in a target language; or generate the translation result by translating the speech included in the received content into a text in the target language.

In a general aspect, a processor-implemented method includes determining a language in a received content, calculating a delay time based on an utterance interval in the received content, extracting an audio utterance from the utterance interval, generating a translation result by translating speech included in the content, in the determined language, into speech in a target language based on the delay time. The method may further include extracting a silence interval from the received content, and calculating the delay time based on a time corresponding to the silence interval.

The method may further include synthesizing the translation result and the received content.

Other features and aspects will be apparent from the following detailed description, the drawings, and the claims.

Figure 1:
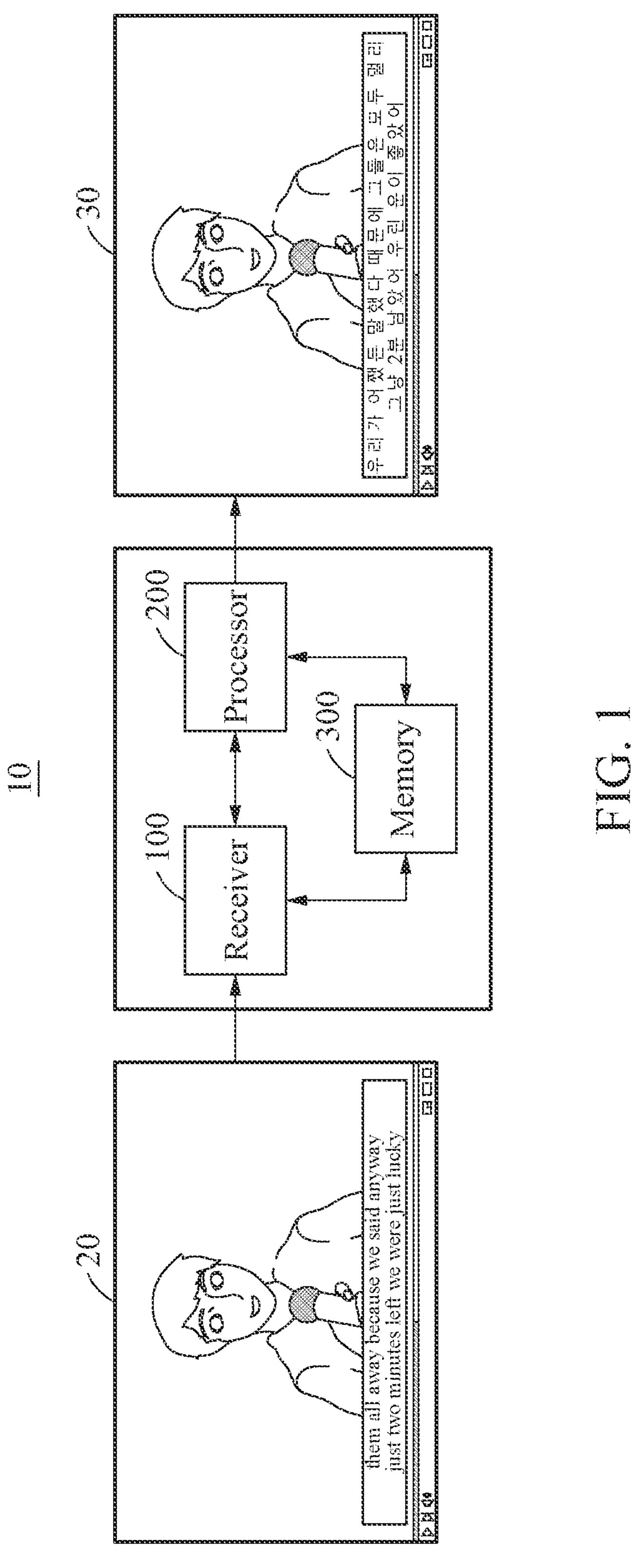
FIG. 1 illustrates an example of a real-time translation apparatus, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness, through omissions of the description of features, it is not intended to infer that they are known.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

An example embodiment and an example benefit may be the application of a combination of speech recognition (speech-to-text), automated translation (text-to-text), and speech synthesis (text-to-speech) to a product and an applied service, and on applied services provided by adding technical features of artificial neural network-based automated translation to a traditional real-time translation method involving an interpreter based on a range of application. It may also be beneficial to apply direct speech-to-speech translation to a real-time translation service.

FIG. 1 illustrates an example of a real-time translation apparatus, in accordance with one or more embodiments.

Referring to FIG. 1, a real-time translation apparatus 10 receives a content, eg., from a content provider 20 and interprets the content in real time. The content may include, but is not limited to, various sets of information or contents provided through the Internet or computer communication, or various sets of digital information or contents such as characters or letters, signs, speeches, sound, and images, and the like, which are then processed and distributed to be used in a wired or wireless communication network.

In an example, the content may include at least one of a video, an audio, or a text. The real-time translation apparatus 10 interprets (i.e., translates) in real time a source language included in the content into a target language 30. The source language may refer to a language used in an original text of the content, and the target language may refer to a language that a user desires to view or listen to in real-time as the source language is being interpreted. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

In an example, speech included in the content may be processed and recognized and thus transcribed into text before being processed in the textual domain. In an example, the processing in the textual domain may include improving clarity of the content, correcting grammar, correcting slangs, altering dialect, and adjusting for determined accents in the content. The processed text may then be or synthesized transduced back into the audio domain for delivery to a listener.

The real-time translation apparatus 10 may interpret the content in real time or simultaneously, and thus help the user immediately understand the received content. As non-limiting examples, the real-time translation apparatus 10 may interpret or translate real-time continuous speech or utterances in the form of sentences, or individual words.

In a typical automated real-time translation approaches or a typical real-time translation apparatuses performed by a human interpreter, for real-time translation of a content, a great amount of time may be necessary to listen to a speech uttered by a speaker, translate the speech into a target language, and utter the translated speech in the target language. Accordingly, there is a time delay between a time period at which the speaker utters and a time period at which a translation result is output.

In an example of interpreting a multimedia content that includes a video using the typical approach, the video and audio may be out of sync, resulting in the interpreted output audio being further out of sync with the video, making it difficult for a user to understand the multimedia content.

There are various approaches to prevent a time difference or time delay between a video and an audio from increasing when a time delay could be accumulated further. For example, one of the approaches is artificial neural network-based automated translation that predicts an entire context, without completely listening to an entire sentence, while interpreting by a unit of phrase, such that the output interpreted speech minimizes a time delay.

In an example of the typical approach involving a human interpreter, a time delay may be reduced by the human interpreter shortening or skipping a translation result and speaking a result that is shorter, though potentially less accurate, than an utterance of an original text expressed in a source language.

However, although these typical approaches above may reduce a translation time, a time to listen to an utterance of an original text may be desired and thus a translation quality may be degraded despite such reduced translation time.

Accordingly, the real-time translation apparatus 10 may implement an additional storage device to, for example, shift an original content in time, which is referred to as time-shift, and reduce or minimize a time delay that may occur due to a time used to listen to a sentence uttered by a speaker in real-time translation.

The real-time translation apparatus 10 may be, or embodied in, as non-limiting examples, an Internet of things (IoT) device, a machine-type communication device, and a portable electronic device, for example.

The portable electronic device may include, for example, a laptop computer, a mobile phone, a smartphone, a tablet personal computer (PC), a mobile Internet device (MID), a personal digital assistant (PDA), an enterprise digital assistant (EDA), a digital still camera, a digital video camera, a portable multimedia player (PMP), a personal or portable navigation device (PND), a handheld game console, an e-book, a smart device, and the like. The smart device may include, for example, a smart watch and a smart band.

As illustrated in FIG. 1, the real-time translation apparatus 10 may include a receiver 100 and a processor 200. The real-time translation apparatus 10 may further include a memory 300, as non-limiting examples.

The receiver 100 receives a content. The receiver 100 may receive the content through an electric telecommunication line, or from the memory 300.

The receiver 100 outputs the received content to the processor 200.

The processor 200 processes data stored in the memory 300. In an example, the real-time translation apparatus 10 may further store instructions, e.g., in memory 300, which when executed by the processor 200 configure the processor 200 to implement one or more or any or all combinations of operations herein. Thus, the processor 200 and the memory 300 may be implemented by hardware, or a combination of hardware and the stored instructions, and may respectively be representative of one or more processors 200 and one or more memories 300.

The processor 200 may be a data processing device embodied by hardware having a circuit of a physical structure to execute desired operations.

The data processing device embodied by hardware may include, for example, a microprocessor, a central processing unit (CPU), a processor core, a multicore processor, a multiprocessor, an application-specific integrated circuit (ASIC), a field-programmable gate array (FPGA), and the like.

The processor 200 may interpret the received content in real time. The processor 200 may secure a time by time-shifting the content, translate the time-shifted content, and synthesize a result of the translating (herein simply referred to as a translation result) and a video (or a video of the content), and may provide a user with the synthesized result of the real-time translation, e.g., without a time delay.

The processor 200 may determine a time-shift of the content based on a type of a language used in the content, and store or buffer an amount of the content corresponding to the determined time-shift.

The processor 200 may determine a delay time for real-time translation based on a silence interval and an utterance interval of the received content.

The processor 200 may calculate the delay time based on the silence interval. For example, the processor 200 may extract the silence interval from the content, and calculate the delay time based on a time corresponding to the extracted silence interval.

The silence interval may refer to an interval of the content in which sound or utterance does not exist.

The processor 200 may calculate the delay time based on the utterance interval. For example, the processor 200 may extract the utterance interval from the content, and calculate the delay time based on a time corresponding to the extracted utterance interval.

The utterance interval may refer to an interval in which a human utterance exists.

The processor 200 may extract an audio in the utterance interval from the content and filter an utterance from the extracted audio. Through the filtering process, the processor 200 may identify an utterance or speech from the audio. In an example, the real-time translation apparatus 10 may include a speech recognition operation which recognizes an utterance of a user 20. The utterance may be input through a microphone. The speech recognition process receives a digital audio signal, and generates a speech recognition result in a text format.

The processor 200 may generate a translation result by translating a language used in the content based on the delay time. The processor 200 may modify the translation result such that an utterance time of the translation result does not exceed the determined delay time. In an example, a respective "utterance time" refers to a time period or a length of the continuous speech or a time period or a length of a respective uttered word or phrase.

For example, the processor 200 may generate at least one candidate translation result by translating the original language used in the received content. The processor 200 may compare an utterance length of the generated candidate translation result to the delay time. The processor 200 may replace the generated candidate translation result with another or a second candidate translation result based on a result of the comparing.

In this example, when the utterance length of the generated candidate translation result exceeds the delay time, the processor 200 may replace the generated candidate translation result with another candidate translation result. Through the replacing, the processor 200 may reduce the utterance time of the translation result.

The processor 200 may compare an utterance length of the second candidate translation result to the delay time. The processor 200 may rephrase the second candidate translation result based on a result of comparing the second candidate translation result to the delay time. For example, when the utterance length of the second candidate translation result exceeds the delay time, the processor 200 may rephrase the second candidate translation result. As a result of the rephrasing of the second candidate translation result, the processor 200 may reduce the utterance time of the final translation result.

In an example, the processor 200 may arrange a generated plurality of candidate translation results based on an utterance time of each, select a candidate translation result of which an utterance time is within the delay time from among the generated candidate translation results, and rephrase the selected candidate translation result. The candidate translation result may be selected so that the utterance length of the final translation result does not exceed the delay time. Additionally, a performance degradation of the selected candidate translation result preferably be within an acceptable range.

In this example, the processor 200 may generate the candidate translation results through an automated translation model. In an example, for the automated translation model, a beam search-based translation method may be used. In an example, the processor 200 may determine a number of candidate translation results corresponding to a number of beam sizes by using a beam search algorithm during a decoding process, after machine translation is performed.

In a non-limiting example, the processor 200 may select a final translation result based on scores of the determined candidate results.

The automated translation model may infer a translation result in a target language and an utterance time of the translation result along with the translation result, and thus effectively perform rephrasing.

The processor 200 may compare an utterance length of the rephrased candidate translation result to the delay time. The processor 200 may adjust an utterance speed of the rephrased candidate translation result based on a result of the comparing. For example, when the utterance length of the rephrased candidate translation result exceeds the delay time, the processor 200 may increase an utterance speed of the rephrased candidate translation result to reduce the utterance time. As a non-limiting example, the utterance speed may be determined based on a number of phonemes, morphemes, syllables, letters, or words uttered per unit time in the received content.

The processor 200 may generate the final translation result by translating a speech included in the received content directly into a speech in the target language 30. Alternatively, the processor 200 may generate the final translation result by translating the speech included in the content into a text in the target language.

The processor 200 may synthesize the final translation result and the content, e.g., by combining the final translation result with in-sync video.

The memory 300 stores instructions or a program executable by the processor 200. For example, the instructions may include an instruction used to execute an operation of the processor 200 and/or an operation of each component of the processor 200.

The memory 300 may be embodied by a volatile or nonvolatile memory device.

The volatile memory device may be embodied by a dynamic random-access memory (RAM) (DRAM), a static RAM (SRAM), a thyristor RAM (T-RAM), a zero-capacitor RAM (Z-RAM), or a twin-transistor RAM (TTRAM).

The nonvolatile memory device may be embodied by an electrically erasable programmable read-only memory (EEPROM), a flash memory, a magnetic RAM (MRAM), a spin-transfer torque (STT) MRAM, a conductive bridging RAM (CBRAM), a ferroelectric RAM (FeRAM), a phase change RAM (PRAM), a resistive RAM (ReRAM), a nanotube RRAM, a polymer RAM (PoRAM), a nano-floating gate memory (NFGM), a holographic memory, a molecular electronic memory device, or an insulator resistance change memory.

Figure 2:
FIG. 2 illustrates an example of a processor, in accordance with one or more embodiments.
Figure 2:
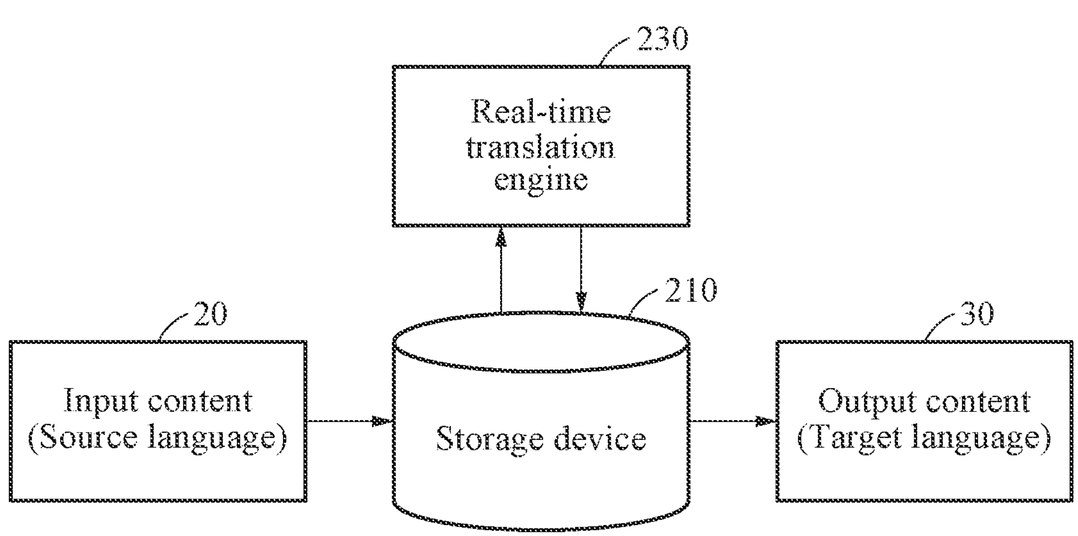
Figure 3:
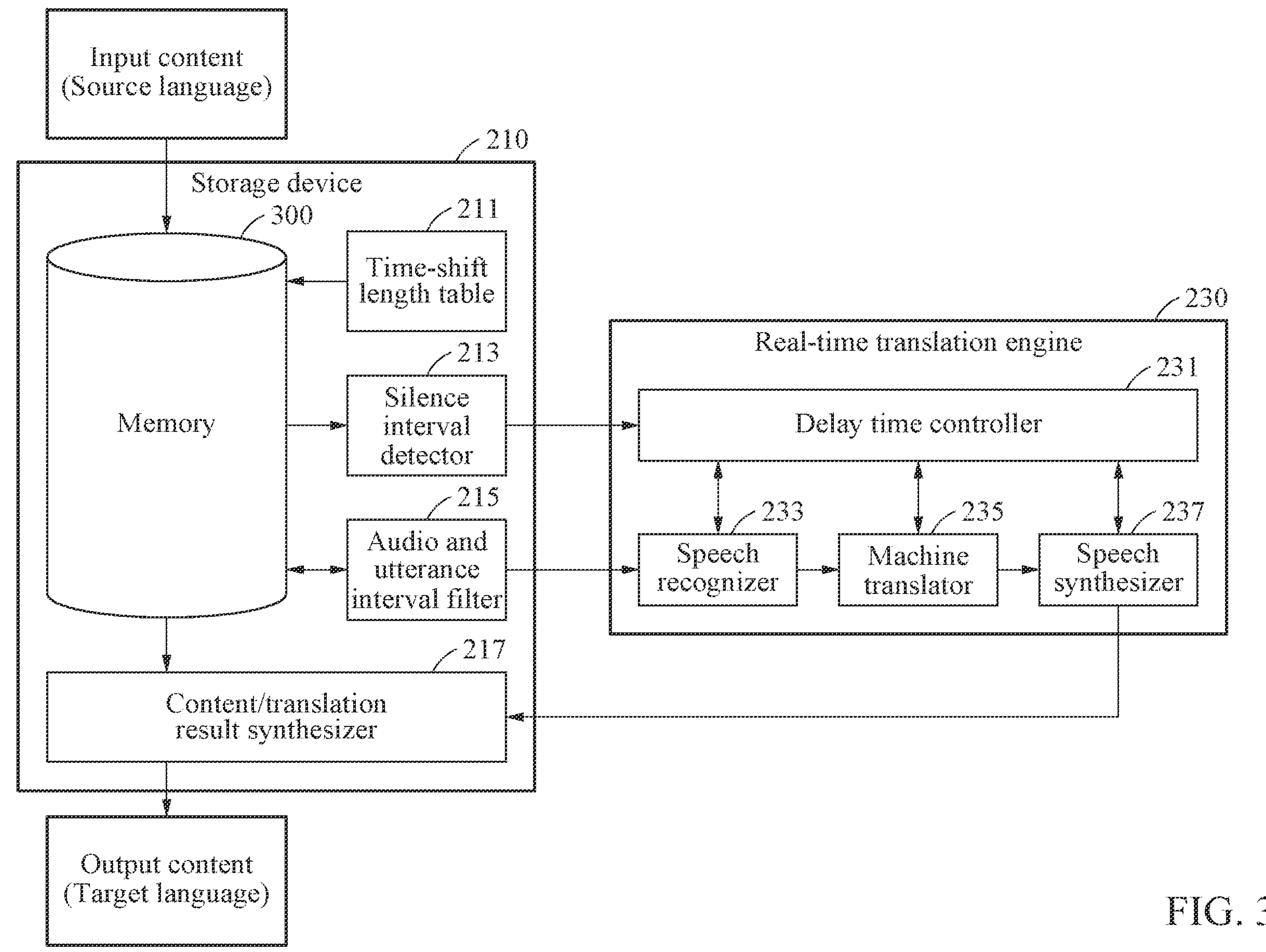
FIG. 3 illustrates an example of a processor in accordance with one or more embodiments.

FIG. 2 illustrates an example of a processor, and FIG. 3 is a diagram illustrating an example of a processor. For brevity of explanation, examples wherein the processor of FIG. 2 corresponds to the processor 200 of FIG. 1, and examples where the processor of FIG. 3 corresponds to the processor 200 of FIG. 1 or the processor 200 of FIG. 2 will be discussed, noting that examples are not limited thereto.

Thus, referring to FIGS. 2 and 3, the processor 200 may receive a content expressed in a source language, perform real-time translation, and output a content expressed in a target language.

The processor 200 may secure a time corresponding to a preset time through a time-shift operation and perform overall translation, and synthesize a result of the translation with a time corresponding to a video and provide a user with a result of the synthesizing through, for example, a display. The user may then enjoy a content in which the video and the resulting audio are in sync as a result of the real-time translation through an output of the real-time translation apparatus 10.

The processor 200 may perform a time-shift process on an original content, and then provide the user with the content that is delayed in time by a slight time or a predetermined time from a start time of the content, and a content that is transmitted in real time with a high quality translation result may be provided.

Additionally, even when a delay in the start time of the content is not available for the time-shift process, the processor 200 may adjust a length of an translation result expressed in an output language in response to an input language and output the content in which a video and an audio are in sync.

Referring to FIG. 2, the processor 200 may include a storage device 210 and a real-time translation engine 230.

The storage device 210 time-shifts a received content by a determined time-shift length, and stores the time-shifted content in a memory, e.g., the memory 300, as a non-limiting example. The storage device 210 may separate an audio and an utterance of a speaker in a time-shift interval, and output the utterance to the real-time translation engine 230.

The storage device 210 may detect a silence interval in the time-shift interval, and output the detected silence interval to the real-time translation engine 230. The storage device 210 may receive a translation result from the real-time translation engine 230, and synthesize a video and an audio.

Referring to FIG. 3, the storage device 210 may include a time-shift length table 211, a silence interval detector 213, an audio and utterance interval filter 215, and a content/translation result synthesizer 217. Additionally, the storage device 210 may include the memory 300. In an example, the memory 300 may be located inside or outside the storage device 210 depending on different implementations.

The real-time translation engine 230 may include a delay time controller 231, a speech recognizer 233, and a machine translator 235. In an example, the real-time translation engine 230 may include a speech synthesizer 237.

The time-shift length table 211 of the storage device 210 may determine a time-shift based on a determined language of the received content. The time-shift length table 211 may experimentally determine a time-shift value needed for each of plural languages, translate and store the time-shift value in the memory 300. The time-shift length table 211 may determine a time-shift length based on the source language, a target language, and a corresponding model used by the real-time translation engine 230.

The time-shift length table 211 determines the time-shift using a table stored in advance of the receipt of the content.

The silence interval detector 213 may detect a silence interval of the content. The silence interval detector 213 may output the detected silence interval to the delay time controller 231.

The audio and utterance interval filter 215 may extract only an utterance of a speaker by filtering out an audio that is not an utterance, for an utterance interval in the content. The audio and utterance interval filter 215 may output the extracted utterance to the speech recognizer 233.

The content/translation result synthesizer 217 may receive a translation result from the real-time translation engine 230, and synthesize the received translation result with the original content, e.g., with the original video, or the original video and the filtered-out non-utterance audio, as non-limiting examples. Accordingly, the processor 200 may provide, in real time, a user with a content in which a translated audio and a video are in sync.

The delay time controller 231 may determine a delay time based on the determined time-shift, the silence interval, and the utterance interval. For example, when the silence interval increases, a total amount of time to be used to utter the translation result may increase. However, when the utterance interval increases, a total amount of time available for a user to utter the translation result may decrease.

The delay time controller 231 may determine the delay time based on the silence interval and the utterance interval in the determined time-shift.

The delay time controller 231 may control or manage an available translation time for an utterance time of the original content. The delay time controller 231 receives a timestamp for each token, e.g. each recognized phoneme, morpheme or word, from the speech recognizer 233 and sets a reference translation time.

The delay time controller 231 may expand the silence interval received from the storage device 210 to be a spare time, and apply the spare time to the delay time. Additionally, the delay time controller 231 may control a length of a translation result generated by the machine translator 235, and control the speech synthesizer 237 to manage an utterance time for each token.

The speech recognizer 233 may recognize a speech or an utterance received from the audio and utterance interval filter 215, and convert or transcribe the recognized speech to a text. The speech recognizer 233 may include a model configured with an artificial neural network, e.g., with acoustic or language models. Thus, the speech recognizer 233 may perform this automatic speech recognition (ASR) on an audio transferred from the storage device 210.

The speech recognizer 233 may store a timestamp for each token, and output the stored timestamp to the delay time controller 231. Here, a token refers to a character or a set of characters that is generated by tokenizing a corpus of natural language.

The machine translator 235 may receive the text from the speech recognizer 233, and translate the received text. The machine translator 235 may include a model configured with an artificial neural network. The machine translator 235 generates the translation (herein simply referred to as a translation result) in a text format, and in an example, may output the generated text directly to the content/translation result synthesizer 217, and/or may output the generated text to the speech synthesizer 237.

The machine translator 235 may perform neural machine translation (NMT). The machine translator 235 may adjust an utterance time of an output using a model trained with an average utterance time for each token that is specific to automated translation, in addition to performing general translation.

The machine translator 235 may control a length of the translation result under the control of the delay time controller 231. In an example, when the length of the translation result is long, the machine translator 235 may perform rephrasing.

The speech synthesizer 237 performs a text-to-speech (TTS) synthesis. For example, the speech synthesizer 237 converts, to a speech, the translation result in the text format. The speech synthesizer 237 outputs, to the content/translation result synthesizer 217, the synthesized speech.

The speech synthesizer 237 may adjust a ratio of the utterance time for each token based on a control operation of the delay time controller 231.

Figure 4:
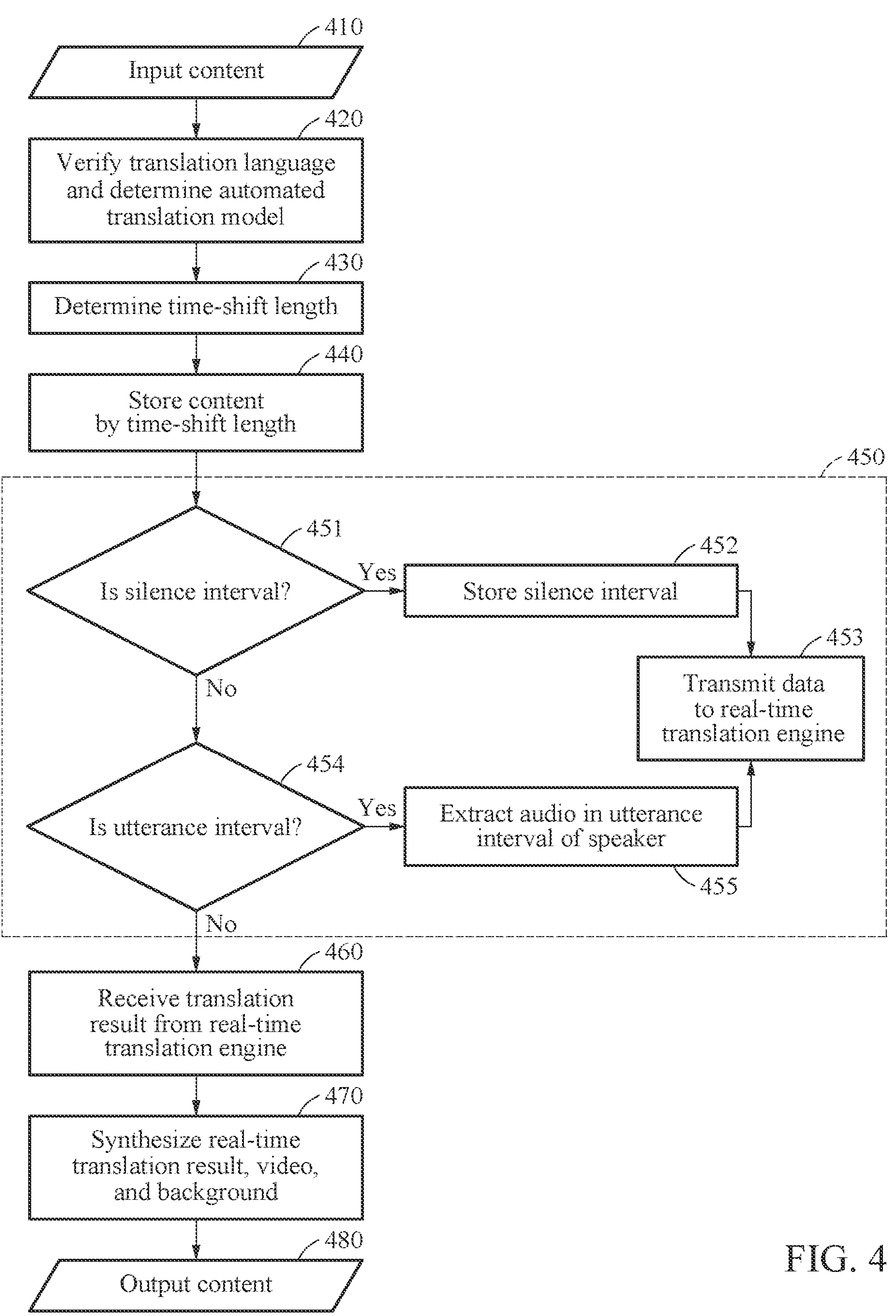
FIG. 4 is a flowchart illustrating an example of an operation of a storage device, in accordance with one or more embodiments.

FIG. 4 is a flowchart illustrating an example of an operation of a storage device, e.g., storage device 210 illustrated in FIG. 2. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

Referring to FIG. 4, in operation 410, the storage device 210 receives a content from the receiver 100. In operation 420, the storage device 210 verifies a determined language on which translation is to be performed, and determines an automated translation model. In operation 430, the storage device 210 determines a time-shift length based on a source language of the original content. In operation 440, the storage device 210 stores an amount or a determined portion of the content corresponding to the time-shift length.

In operation 450, the storage device 210 analyzes the content and determines a silence interval and an utterance interval, and processes the content corresponding to the silence interval and the utterance interval.

In an example, in operation 451, the storage device 210 analyzes the stored content, determines the silence interval, and calculates a length of the silence interval. In operation 452, when the content corresponds to the silence interval, the storage device 210 stores the length of the silence interval. In operation 453, the storage device 210 outputs, to the real-time translation engine 230, information associated with the silence interval.

In operation 454, the storage device 210 analyzes the content and determines the utterance interval of a speaker. In operation 455, when the content corresponds to the utterance interval, the storage device 210 extracts an audio in the utterance interval from the content through filtering and outputs the extracted audio to the real-time translation engine 230.

In operation 460, the storage device 210 receives a translation or translation result from the real-time translation engine 230. In operation 470, the storage device 210 synthesizes the translation result with a video and a background of the original content. In an example, the translation result may include a text and/or a speech. That is, the storage device 210 may synthesize the text, the video, and the background, and/or the speech, the video, and the background.

In operation 480, the storage device 210 outputs the synthesized content to facilitate real-time translation.

Figure 5:
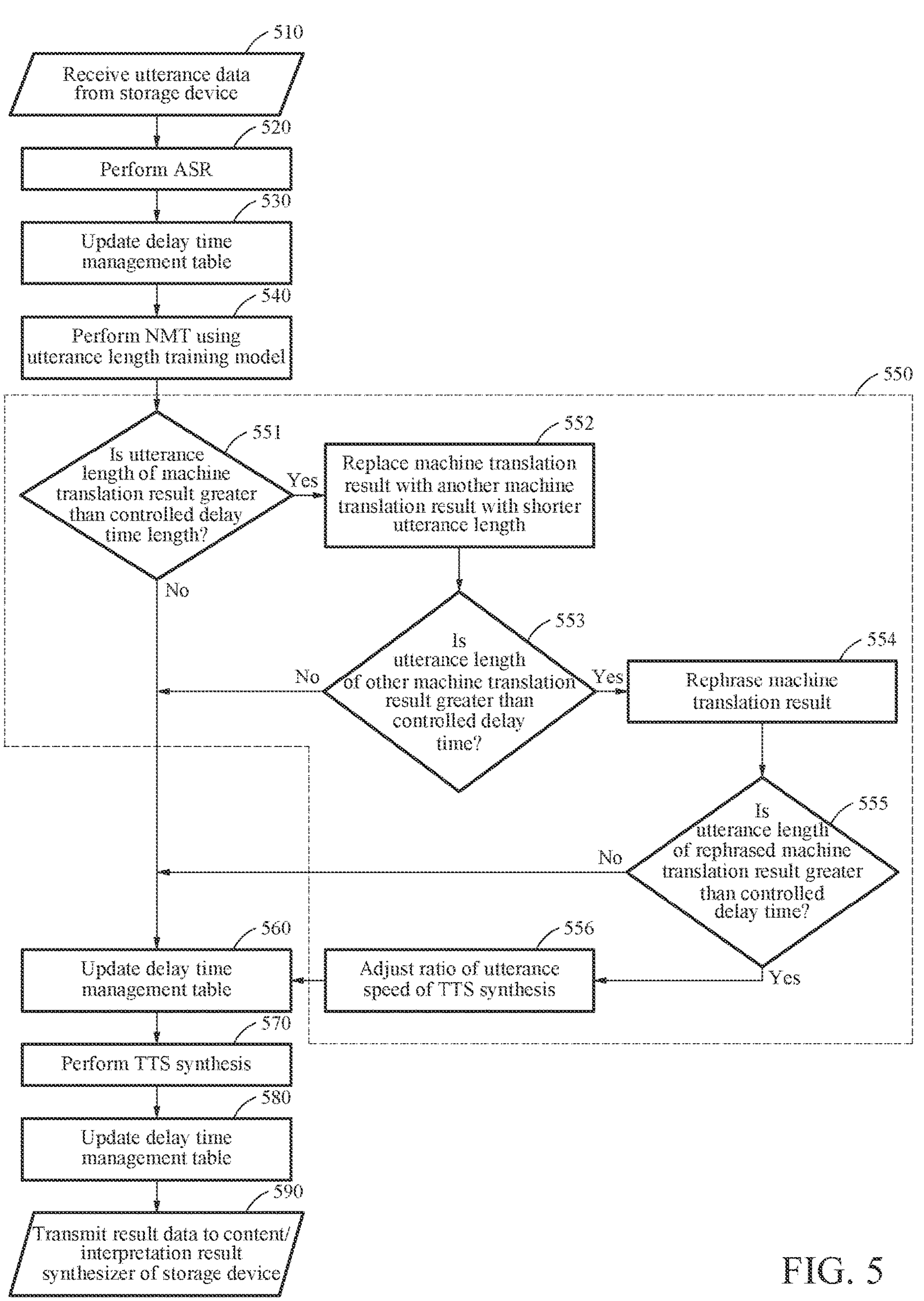
FIG. 5 is a flowchart illustrating an example of an operation of a real-time translation engine, in accordance with one or more embodiments.

FIG. 5 is a flowchart illustrating an example of an operation of a real-time translation engine, e.g., the real-time translation engine 230 illustrated in FIG. 2. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

Referring to FIG. 5, in operation 510, the real-time translation engine 230 receives utterance data from the storage device 210. The utterance data may include speech or utterance data extracted from a content.

In operation 520, the real-time translation engine 230 performs ASR on the received utterance data. For example, the real-time translation engine 230 converts a speech to a text by performing such speech recognition.

The real-time translation engine 230 obtains a timestamp for each token through the speech recognition. In operation 530, the real-time translation engine 230 updates a delay time management table based on a length of an utterance interval. For example, the real-time translation engine 230 generates a reference time point for an translation time by updating the delay time management table through the delay time controller 231. That is, the real-time translation engine 230 determines a delay time.

In operation 540, the real-time translation engine 230 performs automatic translation using an utterance length training model. The real-time translation engine 230 performs the automatic translation with a text as an input.

As described above, the automatic translation may be, as a non-limiting example, NMT. The real-time translation engine 230 generates at least one candidate translation result through the automatic translation.

The real-time translation engine 230 predicts an utterance length of an output result using such automatic translation model trained with an utterance length.

In operation 550, the real-time translation engine 230 controls a translation result not to exceed a delay time occurring by a determined time-shift. For this, the real-time translation engine 230 may adjust an utterance length of a translation result through three steps to be described hereinafter.

In operation 551, the real-time translation engine 230 determines whether an utterance length of the machine translation result is greater than the delay time, for example, a controlled delay time length. In operation 552, when the utterance length of the automatic translation result is greater than the delay time, the real-time translation engine 230 replaces the automatic translation result with a second automatic translation result having a shorter utterance length. That is, the real-time translation engine 230 replaces the generated candidate translation result with a second candidate translation result. In an example, the utterance length may be shortened to fall within the delay time by selecting a shorter candidate translation result among translation results that fall within a given score of many candidate translation results, and by rephrasing the selected candidate result.

In operation 553, the real-time translation engine 230 compares the second candidate translation result to the delay time. In operation 554, when an utterance length of the second candidate translation result is greater than the delay time, the real-time translation engine 230 rephrases the second candidate translation result. Through the rephrasing process, the real-time translation engine 230 may reduce the utterance length.

In operation 555, the real-time translation engine 230 compares an utterance length of the rephrased candidate translation result to the delay time. In operation 556, when the utterance length of the rephrased candidate translation result is greater than the delay time, the real-time translation engine 230 adjusts a ratio of an utterance speed of a TTS synthesis.

Accordingly, the real-time translation engine 230 may control the translation result to be within the delay time. In operation 560, when the utterance length of the translation result is within the delay time, the real-time translation engine 230 updates the delay time management table. In operation 570, the real-time translation engine 230 performs the TTS synthesis. In operation 580, the real-time translation engine 230 updates the delay time management table.

The real-time translation engine 230 may update the delay time management table three times as described above. However, this is only an example, and the real-time translation engine 230 may update the delay time management table a number of times greater than three. The first updating may be performed in operation 530 in which a result of performing the speech recognition based on a length of the silence interval may be updated and applied to the delay time management table. The delay time management table which is updated based solely on the silence interval may not reflect whether a translation result for each token which is a translation unit ends.

Thus, the real-time translation engine 230 may derive a time at which a speech of an original utterance is recognized for each token based on a timestamp value generated in the operation in which the speech recognition is performed, and update the delay time management table such that information on a time within which an utterance for each token in a target language needs to be completed is included in the delay time management table.

The second updating may be performed in operation 560 in which the delay time management table is updated to reflect therein information on how much time is left for an utterance time for the target language compared to a delay time updated based on the translation result.

The third updating may be performed in operation 580 in which the delay time management table is updated to reflect therein information on how much time is left for an utterance time for the target language compared to a reference time that is currently recorded in the delay time management table based on a result of the speech synthesis.

In operation 590, the real-time translation engine 230 outputs the result data to the content/translation result synthesizer 217 of the storage device 210.

Figure 6:
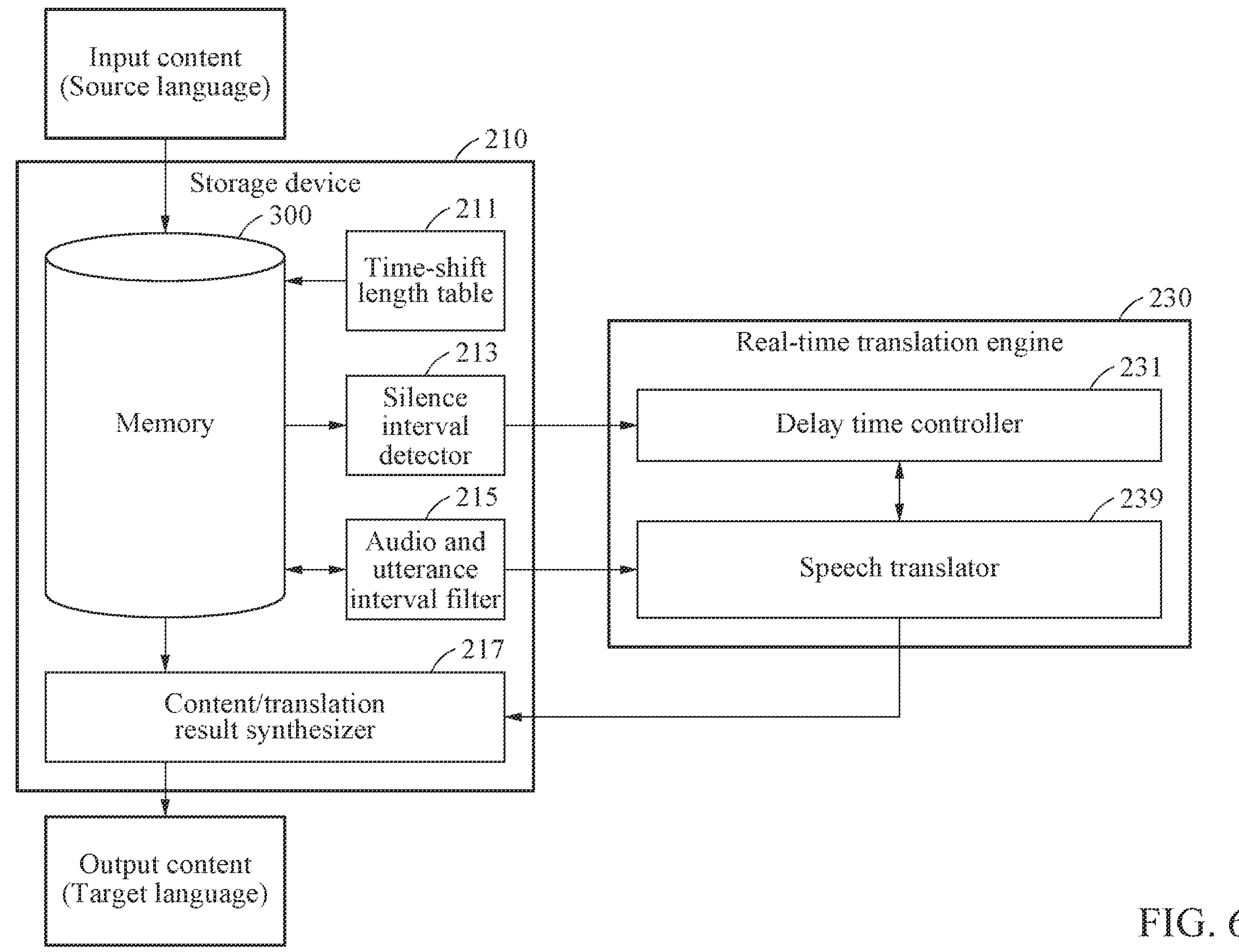
FIG. 6 illustrates an example of a processor, in accordance with one or more embodiments.

FIG. 6 illustrates another example of a processor, e.g., the processor 200 illustrated in FIG. 1.

Referring to FIG. 6, the real-time translation engine 230 may be embodied with only a delay time controller 231 and a speech translator 239, without the speech recognizer 233, the machine translator 235, and the speech synthesizer 237. In this example, the number of artificial neural network models to be implemented may be reduced.

The real-time translation engine 230 may perform direct speech translation through the speech translator 239, instead of outputting a text through speech recognition.

The speech translator 239 may perform speech-to-speech translation. Thus, it may be possible to readily manage or control a delay time by simplifying operations without additionally controlling or managing a delay time for the three modules, for example, the speech recognizer 233, the machine translator 235, and the speech synthesizer 237.

Additionally, a delay time that may occur while switching the operations of the respective modules may be reduced.

Figure 7:
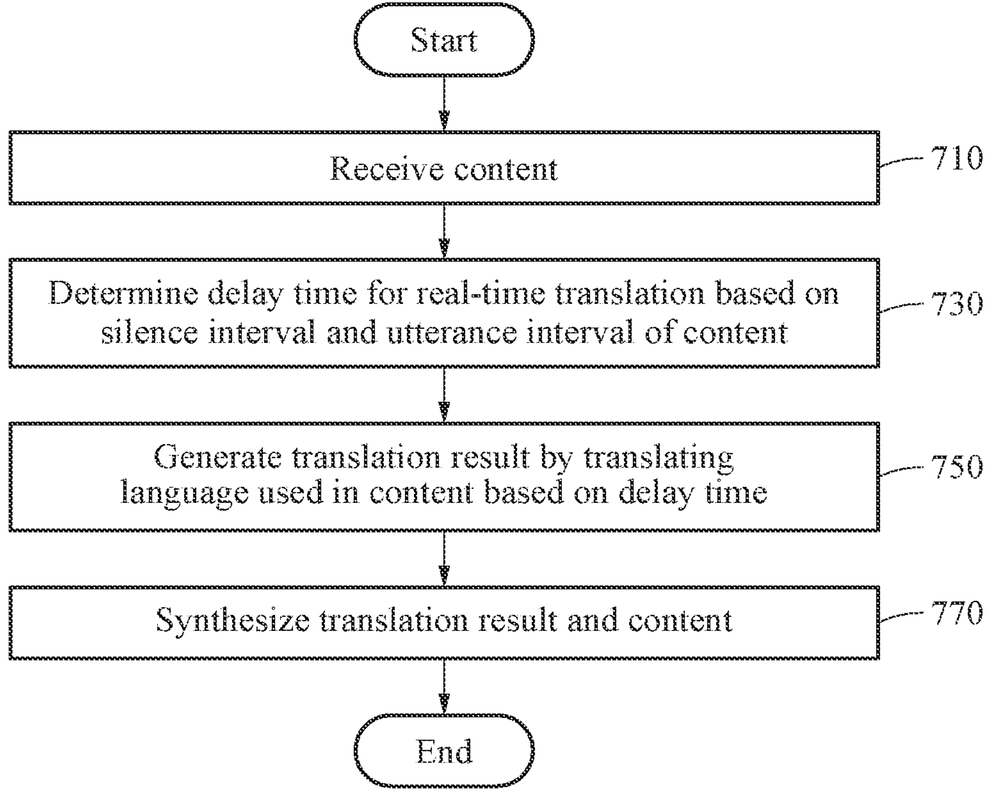
FIG. 7 is a flowchart illustrating an example of an operation of a real-time translation apparatus, in accordance with one or more embodiments.

FIG. 7 is a flowchart illustrating an example of an operation of a real-time translation apparatus, e.g., the real-time translation apparatus 10 illustrated in FIG. 1. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6 are also applicable to FIG. 7, and are incorporated herein by reference. Thus, the above description may not be repeated here.

Referring to FIG. 7, in operation 710, the receiver 100 receives a content.

The processor 200 determines a time-shift of the content based on a type of a language used in the content. The processor 200 stores an amount or portion of the content corresponding to the determined time-shift.

In operation 730, the processor 200 determines a delay time for real-time translation based on a silence interval and an utterance interval of the content.

The processor 200 calculates the delay time based on the silence time. For example, the processor 200 extracts the silence interval from the content and calculates the delay time based on a time corresponding to the silence interval.

In addition, the processor 200 calculates the delay time based on the utterance interval. For example, the processor 200 extracts the utterance interval from the content and calculates the delay time based on a time corresponding to the utterance interval.

The processor 200 extracts an audio in the utterance interval from the content and filters an utterance from the extracted audio.

In operation 750, the processor 200 generates a translation result by translating the language used in the content based on the determined delay time.

The processor 200 generates at least one candidate translation result by translating the language used in the content.

The processor 200 compares an utterance length of the candidate translation result to the delay time. The processor 200 replaces the generated candidate translation result with at least a second candidate translation result based on a result of the comparing. For example, when the utterance length of the generated candidate translation result exceeds the delay time, the processor 200 replaces generated the candidate translation result with a second candidate translation result.

The processor 200 compares an utterance length of the second candidate translation result to the delay time. The processor 200 rephrases the second candidate translation result based on a result of the comparing. For example, when the utterance length of the second candidate translation result exceeds the delay time, the processor 200 rephrases the other candidate translation result.

The processor 200 compares an utterance length of the rephrased candidate translation result to the delay time. The processor 200 adjusts an utterance speed of the rephrased candidate translation result based on a result of the comparing. For example, when the utterance length of the rephrased candidate translation result exceeds the delay time, the processor 200 increases the utterance speed of the rephrased candidate translation result, and thus reduces an utterance time.

The processor 200 generates the translation result by translating a speech included in the content directly into a speech in a target language. Alternatively, the processor 200 generates the translation result by translating the speech included in the content into a text in the target language.

In operation 770, the processor 200 synthesizes the translation result and the content.

The real-time translation apparatus 10, receiver 100, processor 200, memory 300, real-time translation engine 230, storage device 210, speech recognizer 233, machine translator 235, speech synthesizer 237, time-shift length table 211, silence interval detector 213, audio and utterance interval filter 214, content/translation result synthesizer 217, and speech translator 239 discussed herein and with respect to FIGS. 1-7 are implemented as and by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented translation method comprising:

receiving, by a processor, a content;

determining, by the processor, a time-shift of the received content based on a source language of the received content and a table, wherein the table has time-shift values corresponding to a plurality of languages;

determining, by the processor, a delay time for a real-time translation based on the time-shift of the received content and a silence interval in the received content;

generating, by the processor, a translation result through a trained automated translation model by translating a phrasing used in the received content based on the delay time;

synthesizing, by the processor, the generated translation result and the received content; and providing a user with the synthesized result of the generated translation result and the received content in real-time.

2. The method of claim 1, wherein the time-shift is determined based on the source language and a target language; and the target language corresponds to a language that a user desires to view or listen.

3. The method of claim 1, wherein the table comprises experimentally determined time-shift values for each of the plurality of languages.

4. The method of claim 1, further comprising:

storing an amount of the received content corresponding to the time-shift.

5. The method of claim 1, wherein the determining the delay time comprises:

extracting the silence interval from the received content; and determining the delay time based on a time corresponding to the silence interval.

6. The method of claim 1, wherein the generating of the translation result comprises:

generating the translation result by directly translating a speech included in the received content into speech in a target language; or generating the translation result by translating the speech included in the received content into a text in the target language.

* * * * *